(12) United States Patent
Hayashi et al.

(10) Patent No.: US 6,204,903 B1
(45) Date of Patent: Mar. 20, 2001

(54) REFLECTOR, REFLECTIVE POLARIZING PLATE AND REFLECTIVE LIQUID CRYSTAL DISPLAY

(75) Inventors: Narutoshi Hayashi; Nobuyuki Kurata, both of Ehime (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/000,457

(22) PCT Filed: Jul. 26, 1996

(86) PCT No.: PCT/JP96/02119

§ 371 Date: Jan. 28, 1998

§ 102(e) Date: Jan. 28, 1998

(87) PCT Pub. No.: WO97/05521

PCT Pub. Date: Feb. 13, 1997

(30) Foreign Application Priority Data

| Jul. 28, 1995 | (JP) | 7-192908 |
| Apr. 24, 1996 | (JP) | 8-102484 |
| May 15, 1996 | (JP) | 8-120357 |

(51) Int. Cl.$^7$ .................................................. G02F 1/1335
(52) U.S. Cl. ........................................................ 349/113
(58) Field of Search ............................ 349/113; 359/449, 359/459; 428/687, 409; 205/71, 116

(56) References Cited

U.S. PATENT DOCUMENTS

| 4,040,727 | 8/1977 | Ketchpel . |
| 4,298,249 | 11/1981 | Gloor et al. . |
| 4,431,272 | 2/1984 | Yazawa et al. . |
| 4,706,173 | 11/1987 | Hamada et al. . |
| 5,128,787 | 7/1992 | Blonder ................................. 359/70 |

FOREIGN PATENT DOCUMENTS

| 62-91918 | 4/1987 | (JP) . |
| 4-274217 | 9/1992 | (JP) . |

*Primary Examiner*—James A. Dudek
(74) *Attorney, Agent, or Firm*—Sughrue, Mion, Zinn, Macpeak & Seas, PLLC (57) ABSTRACT

A reflector having one or two reflection angles exhibiting maximums in an angle-dependent distribution curve of intensity of reflected light which is generated when light is illuminated from a light source on the surface of the reflector at specific angles, wherein at least one angle exhibiting the maximum deviates by at least 5 degrees from a regular reflection angle in relation to the incidence angle of the light, and the surface roughness of the reflector is between 200 nm and 1500 nm in terms of a center line average roughness (Ra), and a semi-transmissive reflector having one or two reflection angles which exhibit maximums in an angle-dependent distribution curve of intensity of reflected light which is generated when light is illuminated from a light source on the surface of the reflector at specific angles, wherein at least one angle exhibiting the maximum deviates by at least 5 degrees from a regular reflection angle in relation to the incidence angle of the light. A reflective liquid crystal can display bright images with good visibility, when such a reflector is attached on the liquid crystal display and the screen is viewed from an angle at which the reflection of the external light is avoided.

18 Claims, 6 Drawing Sheets

REFLECTOR, REFLECTIVE POLARIZING PLATE AND REFLECTIVE LIQUID CRYSTAL DISPLAY

FIELD OF THE INVENTION

The present invention relates to a reflector having new distribution characteristics of reflected light amounts, and a reflective polarizing plate and a reflective liquid crystal display comprising such a reflector.

PRIOR ART

In these years, liquid crystal displays are used in various fields, for example, notebook type word processors, personal computers, electronic pocket data books, portable information terminals, amusement equipment, stationery goods, portable telephones, and the like. In particular, reflective liquid displays or semi-transmissive-reflective liquid displays are widely used for portable equipment.

As the reflective liquid crystal displays, those having the structure of first polarizing plate/liquid crystal cell/second polarizing plate/reflector (twisted nematic (TN) cells and super twisted nematic cells), and those having the structure of liquid crystal cell/reflector (guest-host (GH) cells) are used.

The semi-transmissive-reflective liquid crystal displays are used as reflective displays in the daytime or in the light, while they are used as transmissive displays using a back light at night or in the dark.

As the semi-transmissive-reflective liquid crystal displays, those having the structure of first polarizing plate/ liquid crystal cell (a TN or STN cell)/second polarizing plate/semi-transmissive reflector/back light are known.

Since the reflective liquid crystal displays and the semi-transmissive-reflective liquid crystal displays which are used as reflective ones use reflection of external light as a light source, the visibility of their images deteriorate when the images are viewed from an angle at which glares of the images caused by the reflection of external light on the outermost surface, for example, the first polarizing plate, can be avoided.

SUMMARY OF THE INVENTION

One object of the present invention is to provide a reflector which can display bright images with good visibility on a screen of a reflective liquid crystal display, in particular, a portable reflective liquid crystal display, when the reflector is attached on such a liquid crystal display and the image is viewed from an angle at which the reflection of the external light is avoided.

Another object of the present invention is to provide a semi-transmissive reflector which can display bright images with good visibility on an image of a semi-transmissive-reflective liquid crystal display, in particular, a portable semi-transmissive-reflective liquid crystal display, when the reflector is attached on such a liquid crystal display and the image is viewed from an angle at which the reflection of the external light is avoided.

These and other objects and effects of the present invention will be apparent from the following descriptions.

Accordingly, the present invention relates to a reflector having one or two reflection angles which exhibit maximums in an angle-dependent distribution curve of intensity of reflected light which is generated when light is illuminated from a light source on the surface of the reflector at specific angles, wherein at least one angle exhibiting said maximum deviates by at least 5 degrees from a regular reflection angle in relation to the incidence angle of the light, and the surface roughness of the reflector is between 200 nm and 1500 nm in terms of a center line average roughness (Ra), a reflective polarizing plate comprising such a reflector, and a reflective liquid crystal display comprising such a reflective polarizing plate.

Furthermore, the present invention relates to a semi-transmissive reflector having one or two reflection angles which exhibit maximums in an angle-dependent distribution curve of intensity of reflected light which is generated when light is illuminated from a light source on the surface of the reflector at specific angles, wherein at least one angle exhibiting said maximum deviates by at least 5 degrees from a regular reflection angle in relation to the incidence angle of the light, a semi-transmissive-reflective polarizing plate comprising such a semi-transmissive reflector, and a semi-transmissive-reflective liquid crystal display comprising such a semi-transmissive-reflective polarizing plate.

DETAILED DESCRIPTION OF THE INVENTION

The present invention will be explained in detail.
Reflector Reflective Polarizing Plate and Reflective Liquid Crystal Display The reflector of the present invention has one or two reflection angles which exhibit maximums in an angle-dependent distribution curve of intensity of reflected light which is generated when light is illuminated from a light source on the surface of the reflector at specific angles from the normal line to the reflector surface, in which at least one angle corresponding to the maximum deviates by at least 5 degrees from a regular reflection angle in relation to the incidence angle of the light, and the surface roughness of the reflector is between 200 nm and 1500 nm in terms of a center line average roughness (Ra), a reflective polarizing plate comprising such a reflector.

When light is irradiated on the reflector surface at a specific angle from the normal line to the reflector surface, and an incident angle of light on the reflector from the normal line to the reflector surface is represented by $-\theta$ degrees (0 degree<$\theta$<90 degrees), the regular reflection angle is $+\theta$. The reflector and semi-transmissive reflector of the present invention satisfy the following condition:

That is, when the distribution of reflected light is measured for each reflection angle with the incidence angle of $-\theta$, the reflection angle $\theta'$ exhibiting the maximum amount of reflected light (0 degree<$|\theta'|$<90 degrees) satisfies the relationship $|\theta-\theta'|\geq 5$ degrees, and the number of the angles exhibiting the maximums is 1 or 2.

If $|\theta-\theta'|$ is less than 5 degrees, the visibility of the images deteriorates, since the glares caused by the reflection of external light are superposed over the images, when the reflector is incorporated in the liquid crystal display and the screen is viewed from an angle at which the high reflected light amount is obtained. Preferably, $|\theta-\theta'|$ is between 5 and 90 degrees.

If the number of the angles exhibiting the maximums of the reflected light amount exceeds two, the intensity of reflected light at one angle corresponding to the maximum decreases, since the reflected light is scattered. Thus, good visibility of the images cannot be expected, when such a reflector is incorporated in the liquid crystal display.

When two or more light sources are used, and the liquid crystal display is used with fixing the liquid crystal display and a viewing angle, light beams from two or more light sources are reflected at different angles and focused on the eye of a viewer. For this purpose, at least four different slant angles should be set on the reflector surface. In this case, the number of the angles exhibiting the maximum amounts of the reflected light exceeds two (JP-A-4-274217).

A spatial relationship between a light source and a liquid crystal display cannot be uniformly defined in the reflective liquid crystal displays for portable information terminals, portable phones, personal handy phones (PHS), electronic pocket data books, electronic dictionaries, palm top personal computers, and the like, which are the main applications of the reflectors of the present invention. For achieving the large reflected light amount with a specific apparatus, it is necessary to obtain the large reflected light amount by setting a viewing angle in accordance with the angle of reflected light of the light source through the adjustment of the angle between the viewing direction and the surface of the liquid crystal display placed on a palm or a desk, wherever the light source is present. Therefore, for the improvement of the visibility, it is important to increase the intensity of reflected light at an angle at which the distribution of the reflected light is maximized. Accordingly, the number of the angles exhibiting the above maximums should be 2 or less.

Examples of the reflectors, which satisfy the relationship of $|\theta-\theta'|\geq 5$ degrees, and the condition that the number of the angles exhibiting the maximums in the distribution of the reflected light is one or two, are as follows:

(1) A reflector, a surface part of which has a shape such that triangular prisms are arranged in adjacent to each other in their ridge directions, one plane of each prism is in parallel with the surface of the reflector, in which cross sections of the prisms in a plane vertical to the ridges form a saw teeth shape consisted of triangles, an angle of elevation of each triangle, that is, an angle between the slope appearing on the cross section and the base of the triangle which is in parallel with the horizontal plane of the reflector, is between 2.5 and 90 degrees, preferably between 2.5 and 45 degrees, more preferably between 2.5 and 10 degrees, and the triangles are substantially congruent or similar ones, and directed in the same direction.

Figure 1:
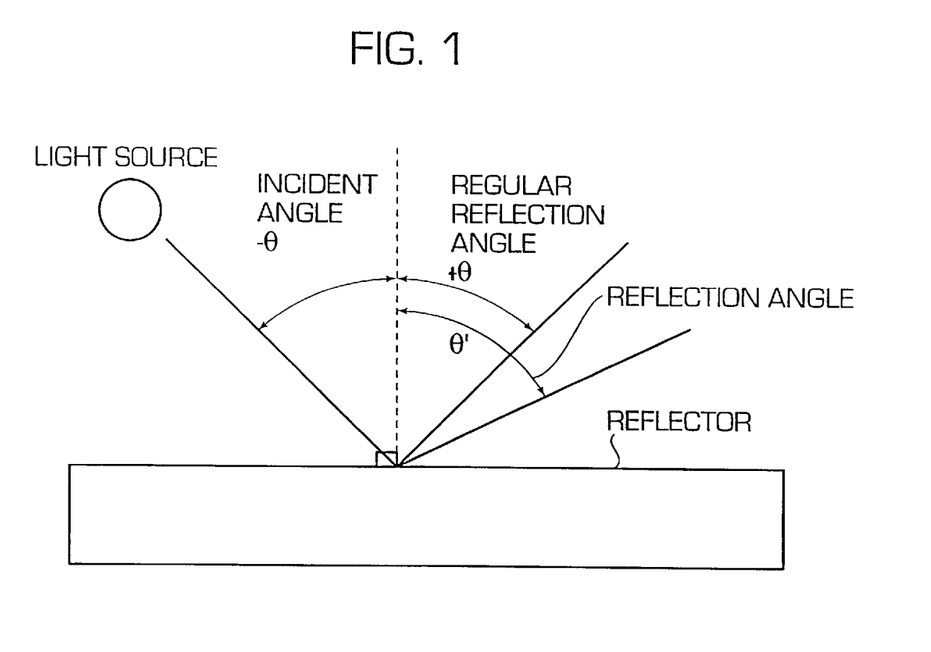
FIG. 1 shows an incidence angle and reflection angles of light on a reflector.
Figure 2:
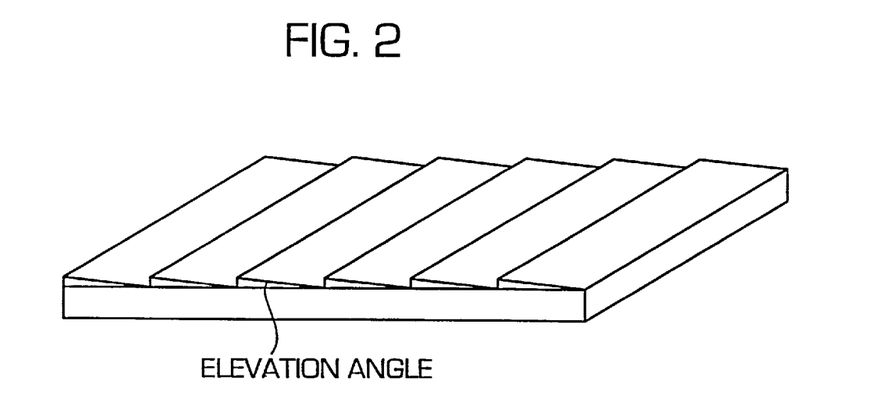
FIG. 2 is a perspective view of the reflector used in Example 1.

FIG. 2 shows an example of the above reflector, in particular, the reflector used in Example 1. The surface part has a shape such that triangular prisms are arranged in adjacent to each other in their ridge directions, and the cross sections of the prisms in a plane vertical to the ridges form a saw teeth shape consisted of triangles, the angles of elevation of each triangle are 7.5 degrees and 90 degrees, and their vertical angle is 82.5 degrees.

Figure 3:
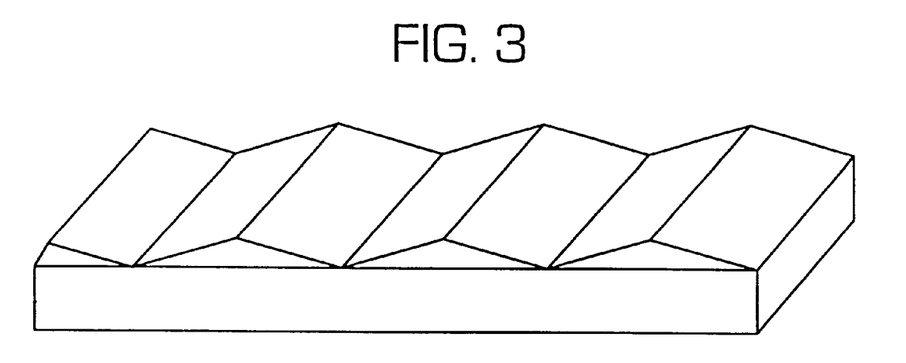
FIG. 3 is a perspective view of the reflector used in Example 2.

FIG. 3 shows another example of the above reflector, in particular, the reflector used in Example 2. The surface part has a shape such that triangular prisms are arranged in adjacent to each other in their ridge directions, and the cross sections of the prisms in a plane vertical to the ridges form a saw teeth shape consisted of isosceles triangles, an angle of elevation of each triangle is 7.5 degrees, and their vertical angle is 165 degrees.

When one of the elevation angles of the triangle is 90 degrees as shown in FIG. 2, the number of the angle is one, which exhibits the maximum in the distribution curve of amounts of the reflected light generated by incident light on the surface of the reflector from a light source at a specific angle deviating from the vertical line to the reflector surface. In this case, the angle exhibiting the maximum is the same as the angle exhibiting the largest value. When both elevation angles are less than 90 degrees, the number of angles exhibiting the maximums is two. When the triangles are isosceles triangles as shown in FIG. 3, the number of the angles exhibiting the maximum is two, and such angles appear at positions which are present on respective sides of the regular reflection angle with deviating by the same angle from the direction of the regular reflection angle. Furthermore, when the regular reflection angle is 30 degrees, and the deviation of the angle exhibiting the maximum from the regular reflection angle is 15 degrees, the angles exhibiting the maximums are 15 degrees and 45 degrees, respectively.

A modification of the above reflector, in which apexes forming the ridges of the triangles are rounded, achieves the same effect, and thus can be used.

A pitch of triangles in the cross section, that is, a length of the side of the triangle which is in parallel with the surface of the reflector, is not limited. The pitch is preferably between 10 $\mu$m and 500 $\mu$m because a regular shape can be formed, and streaks are less remarkable.

When reflector of the present invention is incorporated in the liquid crystal display, a pitch of pixels and that of the triangles of the reflector interfere each other, so that Moiré pattern may form. To prevent the formation of the Moiré pattern, it is practically preferable to (a) allow the pitch of the pixels of the liquid crystal cells and that of the triangles of the reflector to coincide, (b) differ lengths of the bottom sides of the adjacent triangles, or (c) decrease the pitch of the triangles to 100 $\mu$m or less.

Figure 4:
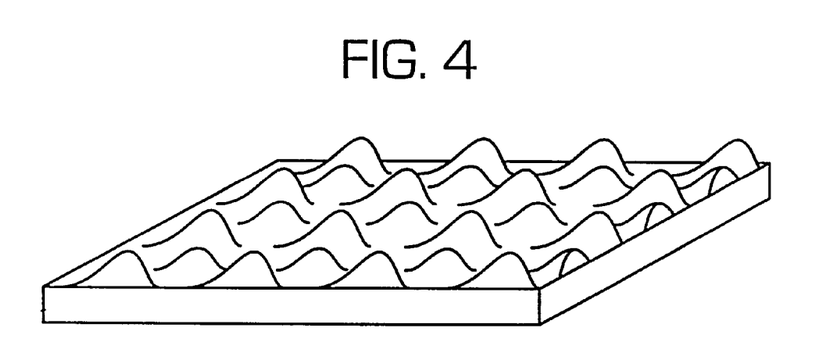
FIG. 4 is a perspective view of one example of the reflector according to the present invention.
Figure 5:
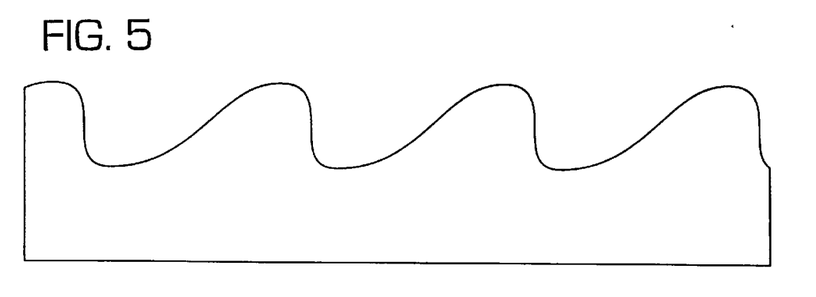
FIGS. 5–8 are cross sections of various examples of the reflectors according to the present invention.
Figure 6:
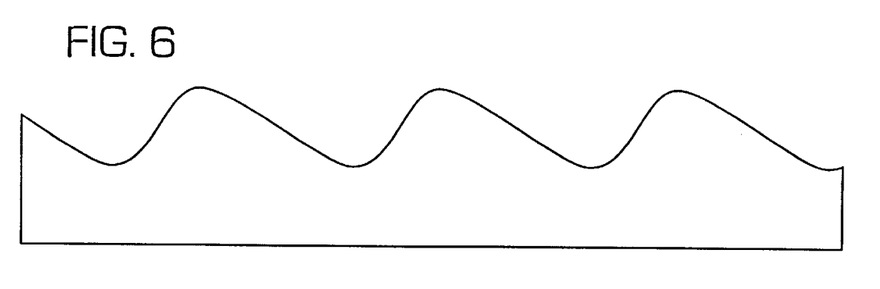
Figure 7:
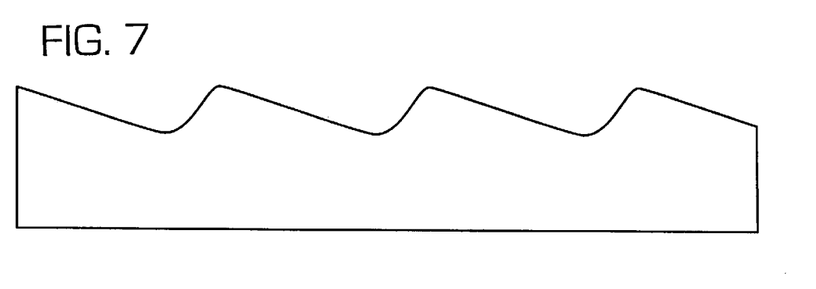
Figure 8:
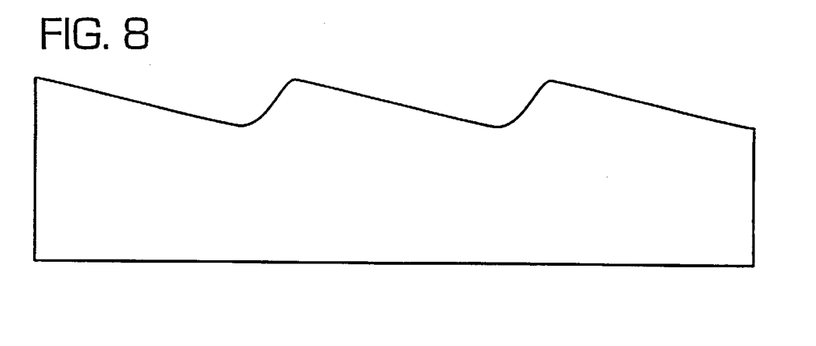

(2) A reflector, a surface part of which comprises depressions or projections which are densely formed over the entire surface, each of depression or projection having an asymmetric cross section at least in one direction, in which the depressions or projections have substantially the same shape and are arranged in substantially the same direction, an angle between each depression or projection and the surface of the reflector (that is, an elevation angle for the projection, or a depression angle for the depression) is between 2.5 and 90 degrees, preferably between 2.5 and 45 degrees, more preferably between 2.5 and 10 degrees (for example, the reflector shown in FIG. 4).

In this reflector, the depressions or projection having the asymmetric cross sections, which may be congruent or similar, at least in one direction, should be densely formed over the whole surface of the reflector. Symmetric depressions or projections such as semi-spheres cannot achieve the properties of the reflector of the present invention. If the number of the depressions or projections is small and a percentage of flat areas is large, the effects of the present invention cannot be attained.

The depressions or projections may have sharp or rounded apexes. Examples of the shapes of depressions or projections are shown in FIGS. 5 to 8.

(3) A reflector, a surface part of which has a shape such that pyramids are clustered together with their base sides being in contact with each other, and their bases are in parallel with the surface of the reflector. Each pyramid has a square or rectangular base, the apex is present on a vertical bisector of at least one side of the base, and all the pyramids have substantially the same shape and arranged in the same direction. The cross sections of the pyramids in a plane vertical to the base and including the vertical bisector of one side of the base form a saw teeth shape consisted of congruent or similar triangles. An elevation angle of each triangle, that is, an angle between the oblique side and base of the triangle appearing in the above cross section, is between 2.5 and 90 degrees, preferably between 2.5 and 45 degrees, more preferably between 2.5 and 10 degrees.

Figure 9:
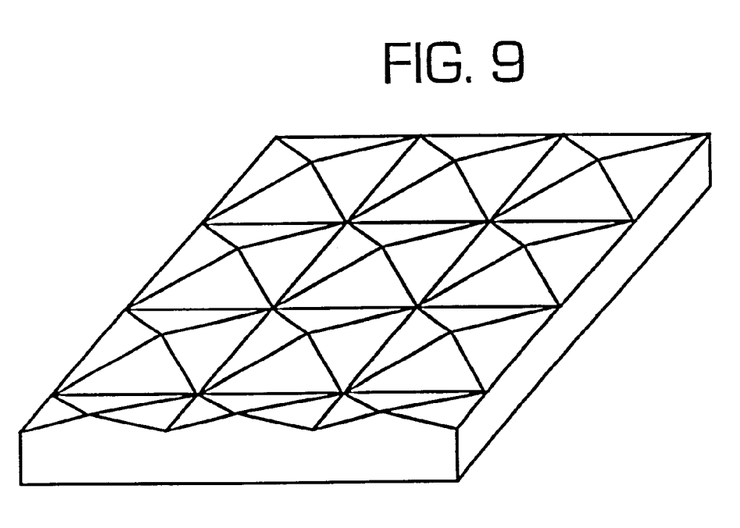
FIG. 9 is a perspective view of the reflector used in Example 3.

An example of such a reflector is shown in FIG. 9, which has a structure consisting of quadrangular pyramids arranged with their bases being in contact with each other. The cross sections of the pyramids in a plane vertical to the base and including the apex of the pyramid and vertical bisector of one side of the bases form a saw teeth shape consisted of triangles. In this example, the elevation angles of the triangle are both 7.5 degrees, and thus the vertical angle is 165 degrees.

A modification of the above reflector, in which apexes forming the ridges of the pyramids are rounded, achieves the same effect, and thus can be used.

A pitch of pyramids, that is, a length of the side of the bottom of the pyramid is preferably between 10 µm and 500 µm because a regular shape can be formed, and streaks are less remarkable.

Examples of substrates of the reflectors are plastic films such as polyethylene terephthalate films, polyester films, polycarbonate films, polyacrylic resin films, polyolefin films, etc.; metal plates such as aluminum plates, copper plates, etc.; glass plates; and the like.

The thickness of the substrate is not limited, and is usually between about 10 µm and about 5 mm.

Examples of the method for forming the surface of the reflector substrate in the above described shape are as follows:

A method comprising forming a negative shape for a desired shape on a roll, and forming the shape by a roll transfer method.

A method comprising forming a negative shape for a desired shape on a roll, applying and filling a UV or electron-beam curable resin in the depressions on the roll, irradiating the liquid resin with maintaining a covered transparent substrate film on the roll intaglio (negative mold), and removing the substrate film to which the cured resin is adhered from the roll intaglio (see JP-A-3-223883 and JP-A-6-324205).

A solvent casting method comprising forming a negative shape for a desired shape on a casting belt, and imparting the desired shape to the substrate during casting.

A press molding method comprising providing a negative mold for a desired shape as a mold, and pressing a thermosetting resin sheet onto the mold to impart the desired shape to the sheet.

In the reflector of the present invention, the surface of the reflector should be roughened to moderately scatter the reflected light. Thus, a center line average roughness (Ra) of the substrate surface is usually between 200 nm and 1500 nm in view of the good irregular reflection properties, and a good reflectance.

The above center line average roughness (Ra) on the substrate surface may be achieved by the following methods:

Previously roughening the surface of a negative mold;

Pressing a resin in which organic and/or inorganic particles are compounded onto a negative mold;

Sand blasting the surface of a reflector after forming the substrate in the desired shape;

Applying a coating liquid containing organic and/or inorganic particles on the surface of a reflector after forming the substrate in the desired shape.

In general, a metal having a high reflectance such as aluminum, silver and the like is vapor deposited on the surface of the substrate, which have been imparted with the surface shape by the above described methods and the center line average roughness of which have been adjusted as described above.

The method for vapor depositing the metal having the high reflectance, and the thickness of the deposited metal are not limited, insofar as the distribution of the reflected light amount on the substrate surface does not change, the condition of $|\theta-\theta'|\geq 5$ degrees is satisfied, and the center line average roughness (Ra) is maintained in the above range. For example, any conventional method employed for vapor depositing a metal such as vacuum deposition, sputtering, ion plating and the like may be suitably selected and used according to the kinds of the substrates.

The thickness of the deposited metal layer is, for example, between 50 nm and 100 nm.

When silver is used and deposited as a metal having the high reflectance, a protective film is preferably formed on the surface of the deposited silver film to prevent the deterioration of the deposited film.

The kind of the protective film is not limited. Preferably, the protected film is a coated film of an acrylic resin, an epoxy resin, a polyester resin, a urethane resin, and an alkyd resin, which may be applied by any conventional method such as roll coating, gravure coating, spray coating, and the like. Alternatively, a thin film of an inorganic material such as $SiO_2$ may be used. The thickness of the protective film is not limited, and is, for example, between 5 nm and 10 µm.

When a metal plate such as an aluminum plate is used as a substrate, it may be used as a reflector without vapor depositing the metal having the high reflectance.

The reflector of the present invention may be laminated on a polarizing plate such as an iodine base polarizing plate, a dye base polarizing plate, etc. with a conventional acrylic adhesive to provide a reflective polarizing plate which is suitable for reflective liquid crystal displays such as TN type, STN type, and GH cell type displays.

The fitting of such a reflector or a reflective polarizing plate to a liquid crystal display provides a reflective liquid crystal display having good visibility of images.

Examples of the structures of the reflective liquid crystal displays are as follows:

Polarizing plate/TN cell/polarizing plate/reflector;

Polarizing plate/phase retarder plate/STN cell/polarizing plate/reflector;

GH cell/reflector.

In these structures, one or more phase difference plates may be placed on and/or below the liquid crystal cell.

Semi-transmissive Reflector, Semi-transmissive-reflective polarizing Plate and Semi-transmissive-reflective Liquid Crystal Display The semi-transmissive reflector of the present invention has one or two angles exhibiting the maximums in an angle-dependent distribution curve of intensity of reflected light which is generated when light is illuminated from a light source on the surface of the reflector at specific angles, and satisfies the conditions that at least one angle exhibiting the maximum deviates by at least 5 degrees from a regular reflection angle in relation to the incidence angle of the light.

The semi-transmissive reflector has a transmission of between about 10 and 60% in terms of transmission of all light beams.

The semi-transmissive reflector may have the same structure as that of the reflector described in the above section, so that it has one or two angles exhibiting -the maximums in an angle-dependent distribution curve of intensity of reflected light which is generated when light is illuminated from a light source on the surface of the reflector at specific angles, and at least one angle exhibiting the maximum deviates by at least 5 degrees from a regular reflection angle in relation to the incidence angle of the light.

The semi-transmissive reflector of the present invention may be produced using the above described substrate. In the case of the semi-transmissive reflector of the present invention, neither the surface of the substrate nor the finally obtained semi-transmissive reflector may be roughened. The thickness of the substrate is not limited, and may be between about 10 μm and 5 mm.

Examples of methods for producing the semi-transmissive reflector are as follows:

(1) Compounding Metal Powder and/or Metal Oxide Powder in a Resin Binder and Coating the Compound on a Substrate Examples of the metal powder are those having metallic gloss such as aluminum powder, tin powder, gold powder, silver powder, etc., and examples of the metal oxides are those having gloss such as aluminum oxide, titanium oxide, oxides of rare earth metals, oxides of alkaline earth metals, etc.

The kind of the resin binder is not limited. Specific examples of the resin binder are acrylic resins, urethane resins, epoxy resins, polyester resins, alkyd resins, polyvinyl alcohol resins, etc.

The metal powder and/or metal oxide powder and the binder resin can be mixed and coated by any conventional method such as roll coating, gravure coating, spray coating, and the like.

The thickness of the coating is between about 5 μm and 200 μm. The resin binder may be tacky.

(2) Compounding Inorganic or/and Organic Glossy Fine Particles in a Binder Resin and Coating the Compound on a Substrate Examples of the inorganic and/or organic glossy fine particles are fine particles having pearl-like gloss such as pearlessence pigments, for example, synthetic or natural mica coated with titanium oxide, fish scale guanine (pearlessence), hexagonal platelet basic lead carbonate, bismuth trichloride, and the like.

The binder resins may be the same as exemplified above. Also, the compounding and coating methods are the same as described above.

The semi-transmissive reflector of the present invention may be laminated on a polarizing plate such as an iodine base polarizing plate, a dye base polarizing plate, etc. with a conventional acrylic adhesive to provide a semi-transmissive-reflective polarizing plate which is suitable for semi-transmissive-reflective liquid crystal displays such as TN type and STN type displays.

The fitting of such a semi-transmissive reflector to a liquid crystal display provides a semi-transmissive-reflective liquid crystal display (polarizing plate/liquid crystal cell/ (polarizing plate/semi-transmissive reflector/back-light) having good visibility of images.

EFFECTS OF THE INVENTION

The reflector of the present invention can assist the reflective liquid crystal displays in displaying the bright images with good visibility on the images of the displays, when the reflector is attached on the liquid crystal displays, and the images are viewed from an angle at which the reflection of the external light is avoided. Furthermore, the semi-transmissive reflector of the present invention can assist the semi-transmissive-reflective displays in displaying the bright images with good visibility on the images of the displays, when the reflector is attached on the liquid crystal displays and the images are viewed from an angle at which the reflection of the external light is avoided.

Accordingly, the reflector or semi-transmissive reflector of the present invention is very useful for the reflective or semi-transmissive-reflective portable liquid crystal displays for portable information terminals, portable phones, personal handy phones (PHS), electronic pocket data books, electronic dictionaries, palm top personal computers, and the like.

EXAMPLES

The present invention will be illustrated by the following examples, which do not limit the present invention in any way.

A distribution of intensity of reflected light from a surface was measured with an automatic variable angle photometer (GP-200 manufactured by Murakami Shikisai Co., Ltd.).

A center line average roughness (Ra) was measured with a surface roughness meter (3ST manufactured by Dektac).

A transmission of all light beams was measured with a reflection-transmission meter (HR-100 manufactured by Murakami Shikisai Co., Ltd.).

Example 1

A reflector was produced by vapor depositing a film of aluminum (having an average thickness of 60 nm) by vacuum deposition on a plastic film (manufactured by Dainippon Printing Co., Ltd.), the surface of which had a saw-teeth shape such that triangular prisms are arranged in adjacent to each other in their ridge directions, as shown in FIG. 2. In the cross section of the prisms, an angle of elevation of each triangle was 7.5 degrees, and the vertical angle was 82.5 degrees. The pitch of the prisms was 200 μm.

The center line average roughness (Ra) of the surface of the reflector was 533 nm.

Figure 10:
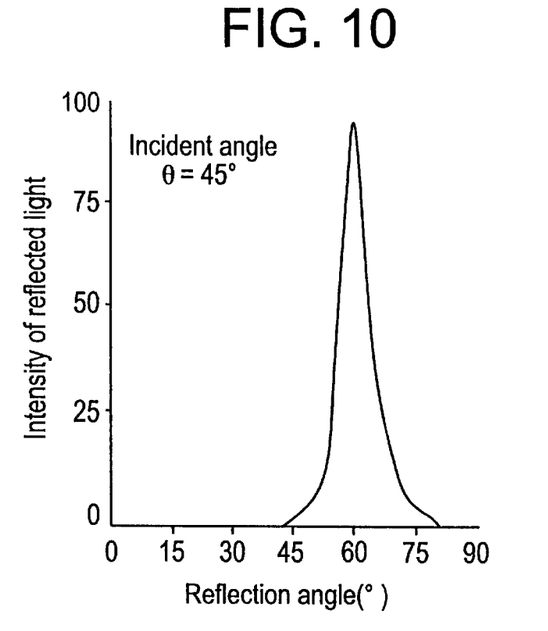
FIG. 10 is a distribution curve of amounts of reflected light from the reflector produced in Example 1.

This reflector was illuminated at an angle of 45 degrees from the vertical direction to the reflector surface, and a angle-dependency of the intensity of reflected light was measured. The results are shown in FIG. 10.

The angle at which the intensity of reflected light was maximized was +60 degrees from the vertical direction. The regular reflection angle was +45. Thus, the deviation of the former angle from the regular reflection angle was 15 degrees.

This reflector was laminated on a polarizing plate (an iodine base polarizing plate; SG manufactured by Sumitomo Chemical Co., Ltd.) with an acrylic adhesive, and a reflective polarizing plate (polarizing plate/reflector) was obtained.

The reflective polarizing plate was attached to one surface of a STN liquid crystal cell. Then, a phase retarder plate (a polycarbonate phase retarder plate; SEF manufactured by Sumitomo Chemical Co., Ltd.) and a polarizing plate (an iodine base polarizing plate; SG manufactured by Sumitomo Chemical Co., Ltd.) were attached to the other surface of the liquid crystal cell. Thus, a reflective STN liquid crystal display device (polarizing plate/phase retarder plate/STN liquid crystal cell/polarizing plate/reflector) was obtained.

This reflective STN liquid crystal display device was operated. It displayed bright images, when the image was viewed from an angle at which the reflection of the external light is avoided. No Moiré pattern formed. Thus, the visibility of the image was good.

Example 2

A reflector was produced by vapor depositing a film of aluminum (having an average thickness of 60 nm) by vacuum deposition on a plastic film (manufactured by Dainippon Printing Co., Ltd.), the surface of which had a saw-teeth shape such that triangular prisms are arranged in adjacent to each other in their ridge directions, as shown in FIG. 3. In the cross section of the prisms, both angles of elevation of each triangle were 7.5 degrees, and the vertical angle was 165 degrees. The pitch of the prisms was 200 μm.

The center line average roughness (Ra) of the surface of the reflector was 389 nm.

Figure 11:
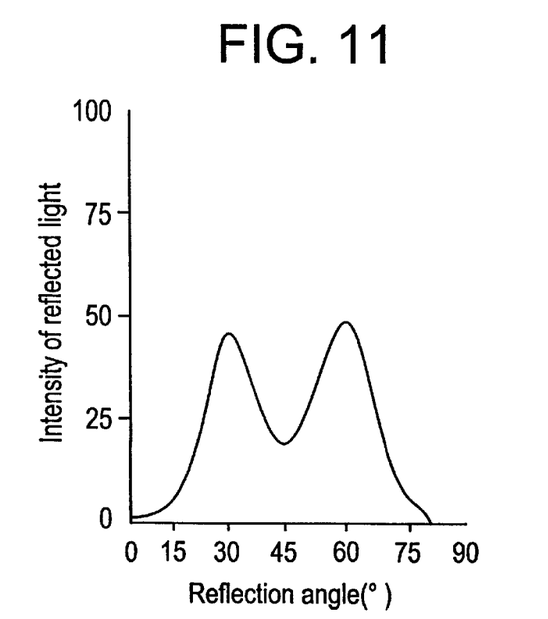
FIG. 11 is a distribution curve of intensity of reflected light from the reflector produced in Example 2.

This reflector was illuminated at an angle of 45 degrees from the vertical direction to the reflector surface, and an angle-dependency of the intensity of reflected light was measured. The results are shown in FIG. 11.

The angles at which the amount of reflected light was maximized were +30 and +60 degrees from the vertical direction. The regular reflection angle was +45 degrees. Thus, the deviations of the former angles from the regular reflection angle were +15 and −15 degrees, respectively.

This reflector was laminated on a polarizing plate (an iodine base polarizing plate; SG-1852A manufactured by Sumitomo Chemical Co., Ltd.) with an acrylic adhesive, and a reflective polarizing plate (polarizing plate/reflector) was obtained.

The reflective polarizing plate was attached to one surface of a TN liquid crystal cell. Then, a polarizing plate (an iodine base polarizing plate; SG-1852A manufactured by Sumitomo Chemical Co., Ltd.) was attached to the other surface of the liquid crystal cell. Thus, a reflective TN liquid crystal display device (polarizing plate/liquid crystal cell/polarizing plate/reflector) was obtained.

This reflective liquid crystal display device was operated. It displayed bright images, when the image was viewed from an angle at which the reflection of the external light is avoided. Thus, the visibility of the image was good.

Example 3

A reflector was produced by vapor depositing a film of aluminum by vacuum deposition on a plastic film having the surface structure consisting of quadrangular pyramids arranged with their bases being in contact with each other, the cross section of which in a plane which includes the center of the slope triangle and is vertical to the base planes of the pyramids was a saw-teeth shape such that triangles are linked, as shown in FIG. 9. In each cross sectional triangle of the pyramid, both angles of elevation of each triangle were 7.5 degrees, and the vertical angle was 165 degrees. The pitch of the prisms was 200 μm.

When this reflector was illuminated at an angle of 45 degrees from the vertical direction to the reflector surface, the angles at which the intensity of reflected light was maximized were 30 and 60 degrees from the normal line, while the regular reflection angle was +45 degrees.

This reflector was laminated on a polarizing plate (an iodine base polarizing plate; SG manufactured by Sumitomo Chemical Co., Ltd.) with an acrylic adhesive, and a reflective polarizing plate (polarizing plate/reflector) was obtained. Then, the reflective polarizing plate was attached to one surface of a STN liquid crystal cell, and a phase retarder plate (a polycarbonate phase retarder plate; SEF manufactured by Sumitomo Chemical Co., Ltd.) and a polarizing plate (an iodine base polarizing plate; SG manufactured by Sumitomo Chemical Co., Ltd.) were attached to the other surface of the liquid crystal cell. Thus, a reflective STN liquid crystal display device (polarizing plate/phase retarder plate/STN liquid crystal cell/polarizing plate/reflector) was obtained.

This reflective liquid crystal display device was operated. It displayed bright images, when the image was viewed from an angle at which the reflection of the external light is avoided. Thus, the visibility of the image was good.

Example 4

Figure 12:
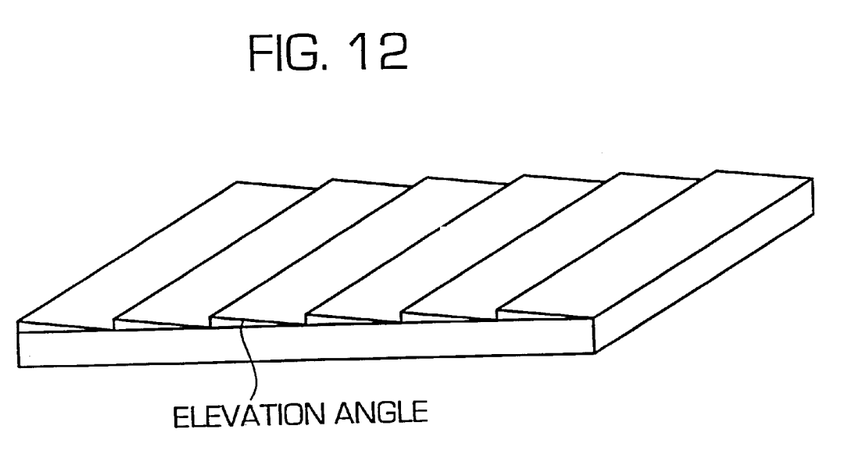
FIG. 12 is a perspective view of the semi-transmissive reflector used in Example 4.

A semi-transmissive reflector was produced by coating an acrylic resin containing 30 wt. % of a pearlessent pigment (Iriodin manufactured by Merk) on a plastic film (manufactured by Dainippon Printing Co., Ltd.), the surface of which had a saw-teeth shape such that triangular prisms are arranged in adjacent to each other in their ridge directions, as shown in FIG. 12. In the cross section of the prisms, the angle of elevation of each triangle was 7.5 degrees, and the vertical angle was 82.5 degrees. The pitch of the prisms was 200 μm.

This semi-transmissive reflector was laminated on a polarizing plate (an iodine base polarizing plate; SUMIKA-RAN SG manufactured by Sumitomo Chemical Co., Ltd.) with an acrylic adhesive, and a semi-transmissive-reflective polarizing plate (polarizing plate/reflector) was obtained. Then, the semi-transmissive-reflective polarizing plate was attached to one surface of a TN liquid crystal cell, and a polarizing plate (an iodine base polarizing plate; SUMIKA-RAN SG manufactured by Sumitomo Chemical Co., Ltd.) was attached to the other surface of the liquid crystal cell. Thus, a semi-transmissive-reflective TN liquid crystal display device (polarizing plate/liquid crystal cell/polarizing plate/semi-transmissive reflector/back light) was obtained.

This liquid crystal display device was operated. It displayed bright images, when the image was viewed from an angle at which the reflection of the external light is avoided. Thus, the visibility of the image was good. Also the bright image was seen and good visibility was achieved, when the image on the screen was viewed using the back light in a dark room.

What is claimed is:

1. A reflector having only one or two reflection angles which exhibit maximums in an angle-dependent distribution curve of intensity of reflected light which is generated when light is illuminated from a light source on the surface of the reflector at specific angles, wherein at least one angle exhibiting said maximum deviates by at least 5 degrees from a regular reflection angle with respect to the horizontal plane of the reflector in relation to the incidence angle of the light, and the surface roughness of the reflector is between 200 nm and 1500 nm in terms of a center line average roughness (Ra), wherein the surface part of said reflector is in the shape of similar or congruent triangular prisms, depressions or projections with cross sections, which appear in at least one direction, forming an asymmetric wave, or pyramids, which are arranged in adjacent to each other form slopes on the surface of said reflector, each having i) a bottom length of 10 to 500 μm and ii) an elevation or depression angle of 2.5 to 10 degrees, and wherein the surfaces of said prisms, depressions or projections, or said pyramids are roughened to have a surface roughness of in the range between 200 nm and 1500 nm in terms of a center line average roughness (Ra).

2. A reflector according to claim 1, wherein the surface part of said reflector has a shape such that triangular prisms are arranged in adjacent to each other in their ridge directions, one plane of each prism is in parallel with the surface of the reflector, in which an angle of each triangle, which is formed by each prism in the cross section of the reflector in the plane perpendicular to the ridge of the prism, between the side in parallel with the horizontal plane of the reflector and the apex corresponding to the ridge (an angle of elevation) is between 2.5 and 90 degrees, and the triangles are substantially congruent or similar ones.

3. A reflector according to claim 1, wherein the surface part of said reflector has a shape such that depressions or projections, cross sections of which appearing in at least one direction form an asymmetric wave, are densely formed over the entire surface, the depressions or projections have substantially the same shape and are arranged in substantially the same direction, and an angle between each depression or projection and the surface of the reflector is between 2.5 and 90 degrees.

4. A reflector according to claim 1, wherein the surface part of said reflector has a shape such that pyramids are clustered together with their base sides being in contact with each other, and their bases are in parallel with the surface of the reflector, in which each pyramid has a square or rectangular base, the apex is present on a vertical bisector of at least one side of the base, all the pyramids have substantially the same shape and arranged in the same direction, the cross sections of the pyramids in a plane vertical to the base and including the vertical bisector of one side of the base and also the apex of the pyramid form connected triangles which are congruent or similar, and an elevation angle of each triangle is between 2.5 and 90 degrees.

5. A reflective polarizing plate comprising a polarizing plate and a reflector as claimed in any one of claims 1 to 4 laminated on said polarizing plate.

6. A reflective liquid crystal display comprising a liquid crystal display and a reflective polarizing plate as claimed in claim 5.

7. A reflective liquid crystal display according to claim 6, which is a reflective TN liquid crystal display.

8. A reflective liquid crystal display according to claim 6, which is a reflective STN liquid crystal display.

9. A reflective liquid crystal display according to claim 6, which is a reflective GH liquid crystal display.

10. A semi-transmissive reflector having only one or two reflection angles which exhibit maximums in an angle-dependent distribution curve of intensity of reflected light which is generated when light is illuminated from a light source on the surface of the reflector at specific angles, wherein at least one angle exhibiting said maximum deviates by at least 5 degrees from a regular reflection angle with respect to the horizontal plane of the reflector in relation to the incidence angle of the light, wherein the surface part of said reflector is in the shape of similar or congruent triangular prisms, depressions or projections with cross sections, which appear in at least one direction, forming an asymmetric wave, or pyramids, which are arranged in adjacent to each other form slopes on the surface of said reflector, each having i) a bottom length of 10 to 500 μm and ii) an elevation or depression angle of 2.5 to 10 degrees, and wherein the surfaces of said prisms, depressions or projections, or said pyramids are roughened to have a surface roughness of in the range between 200 nm and 1500 nm in terms of a center line average roughness (Ra).

11. A semi-transmissive reflector according to claim 10, wherein the surface part of said reflector has a shape such that triangular prisms are arranged in adjacent to each other in their ridge directions, one plane of each prism is in parallel with the surface of the reflector, in which an angle of each triangle, which is formed by each prism in the cross section of the reflector in the plane perpendicular to the ridge of the prism, between the side in parallel with the horizontal plane of the reflector and the apex corresponding to the ridge (an angle of elevation) is between 2.5 and 90 degrees, and the triangles are substantially congruent or similar ones.

12. A semi-transmissive reflector according to claim 10, wherein the surface part of said reflector has a shape such that depressions or projections, cross sections of which appearing in at least one direction form an asymmetric wave, are densely formed over the entire surface, the depressions or projections have substantially the same shape and are arranged in substantially the same direction, and an angle between each depression or projection and the surface of the reflector is between 2.5 and 90 degrees.

13. A semi-transmissive reflector according to claim 10, wherein the surface part of said reflector has a shape such that pyramids are clustered together with their base sides being in contact with each other, and their bases are in parallel with the surface of the reflector, in which each pyramid has a square or rectangular base, the apex is present on a vertical bisector of at least one side of the base, all the pyramids have substantially the same shape and arranged in the same direction, the cross sections of the pyramids in a plane vertical to the base and including, the vertical bisector of one side of the base and also the apex of the pyramid form connected triangles which are congruent or similar, and an elevation angle of each triangle is between 2.5 and 90 degrees.

14. A semi-transmissive reflector according to claim 10, which has a transmission of all light beams in the range between 10 and 60%.

15. A semi-transmissive-reflective polarizing plate comprising a polarizing plate and a semi-transmissive reflector as claimed in any one of claims 10 to 14 laminated on said polarizing plate.

16. A semi-transmissive-reflective liquid crystal display comprising a liquid crystal display and a semi-transmissive-reflective polarizing plate as claimed in claim 15.

17. A semi-transmissive-reflective liquid crystal display according to claim 16, which is a semi-transmissive-reflective TN liquid crystal display.

18. A semi-transmissive-reflective liquid crystal display according to claim 16, which is a semi-transmissive-reflective STN liquid crystal display.

* * * * *